(12) United States Patent
Roth et al.

(10) Patent No.: US 8,891,913 B1
(45) Date of Patent: Nov. 18, 2014

(54) HETEROGENEOUS SEMICONDUCTOR PHOTONIC INTEGRATED CIRCUIT WITH MULTIPLE OFFSET HEIGHTS

(75) Inventors: Jonathan E. Roth, Santa Barbara, CA (US); Jae Shin, Goleta, CA (US); Gregory A. Fish, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 152 days.

(21) Appl. No.: 13/546,803

(22) Filed: Jul. 11, 2012

(51) Int. Cl.
*G02B 6/00* (2006.01)
*G02F 1/035* (2006.01)

(52) U.S. Cl.
USPC .................................. 385/14; 385/27; 385/39

(58) Field of Classification Search
USPC ............ 385/10–14, 15, 16, 129–130, 147, 2, 385/50; 359/483–502; 372/81, 92, 96
See application file for complete search history.

(56) References Cited

U.S. PATENT DOCUMENTS

| | | | | |
|---|---|---|---|---|
| 5,400,418 A | * | 3/1995 | Pearson et al. | 385/11 |
| 6,757,451 B2 | * | 6/2004 | Chang et al. | 385/11 |
| 6,845,198 B2 | * | 1/2005 | Montgomery et al. | 385/50 |
| 7,260,282 B2 | * | 8/2007 | Salib et al. | 385/11 |
| 7,343,057 B2 | * | 3/2008 | Salib et al. | 385/11 |
| 8,358,897 B1 | * | 1/2013 | Fish et al. | 385/131 |
| 8,538,206 B1 | * | 9/2013 | Fish et al. | 385/2 |
| 8,538,221 B1 | * | 9/2013 | Fang et al. | 385/129 |
| 2006/0239308 A1 | * | 10/2006 | Husain et al. | 372/29.013 |
| 2012/0114001 A1 | * | 5/2012 | Fang et al. | 372/45.01 |

* cited by examiner

*Primary Examiner* — Akm Enayet Ullah
(74) *Attorney, Agent, or Firm* — Blakely Sokoloff Taylor & Zafman LLP

(57) ABSTRACT

Embodiments of the invention describe heterogeneous photonic integrated circuits (PIC) wherein a first silicon region is separated from the heterogeneous semiconductor material by a first distance, and a second silicon region is separated from the heterogeneous semiconductor material by a second distance greater than the first distance.

Thus embodiments of the invention may be described as, in heterogeneous regions of a heterogeneous PIC, silicon waveguides using multiple heights of the silicon waveguide, or other structures with multiple offset heights between silicon and heterogeneous materials (as described herein).

18 Claims, 14 Drawing Sheets

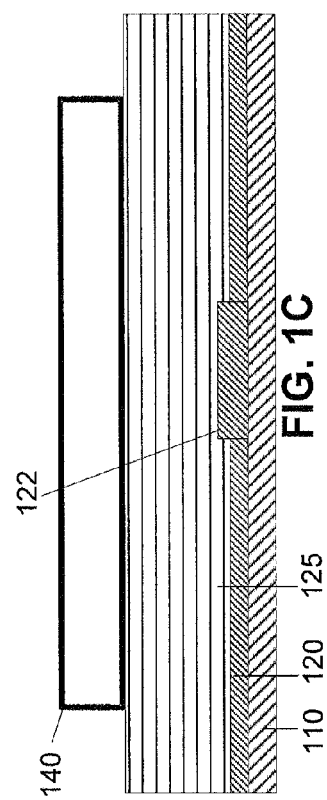
FIG. 1B
FIG. 1C
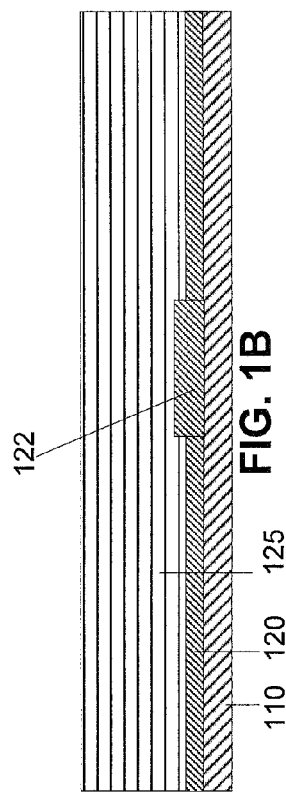
FIG. 1D
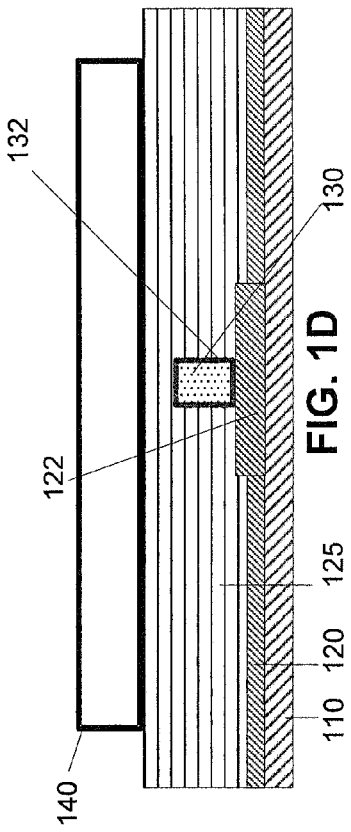
FIG. 1E

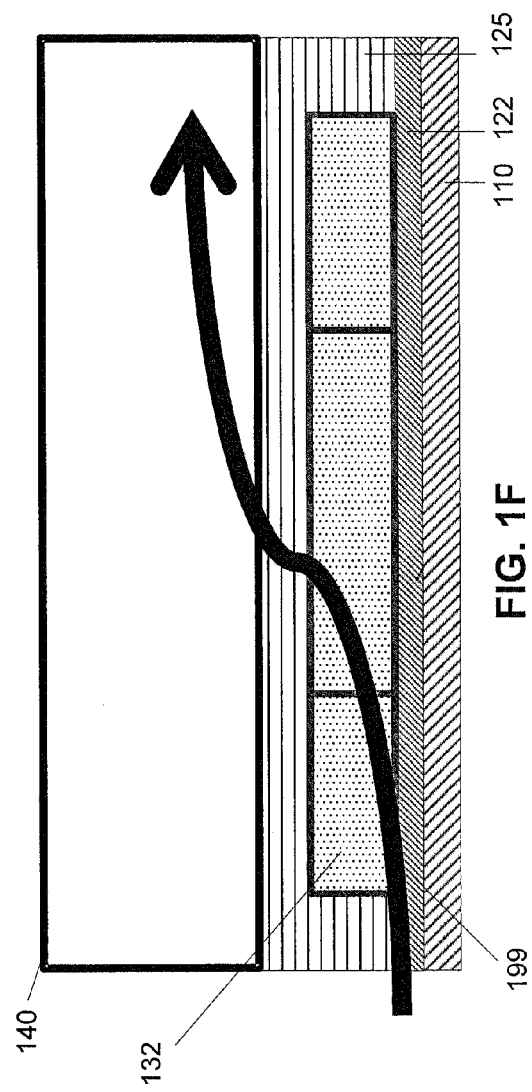

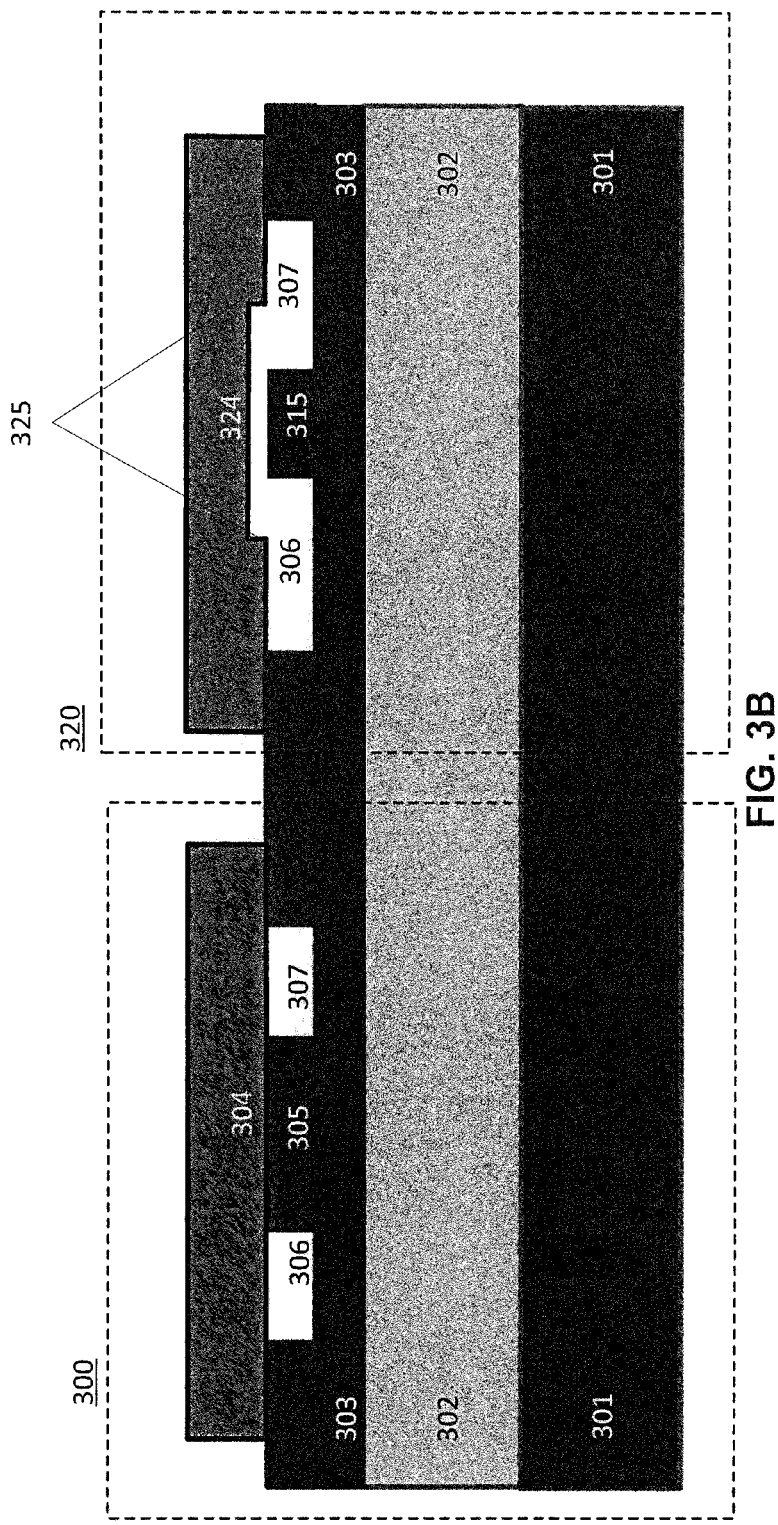

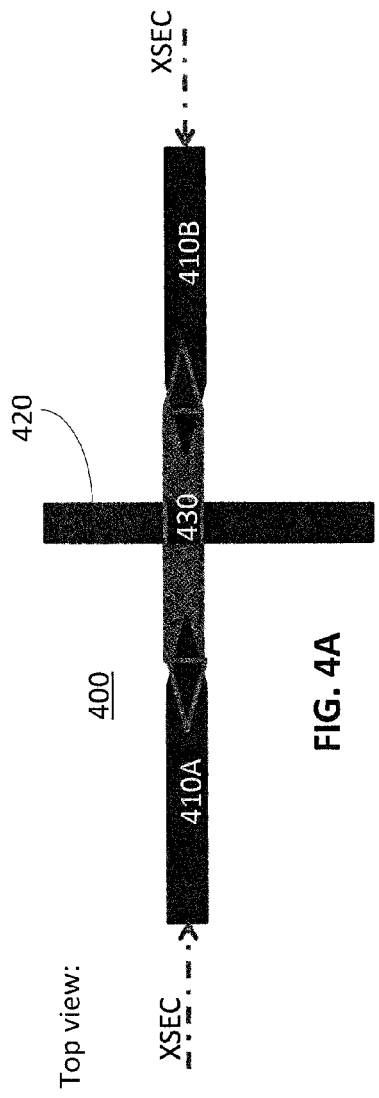
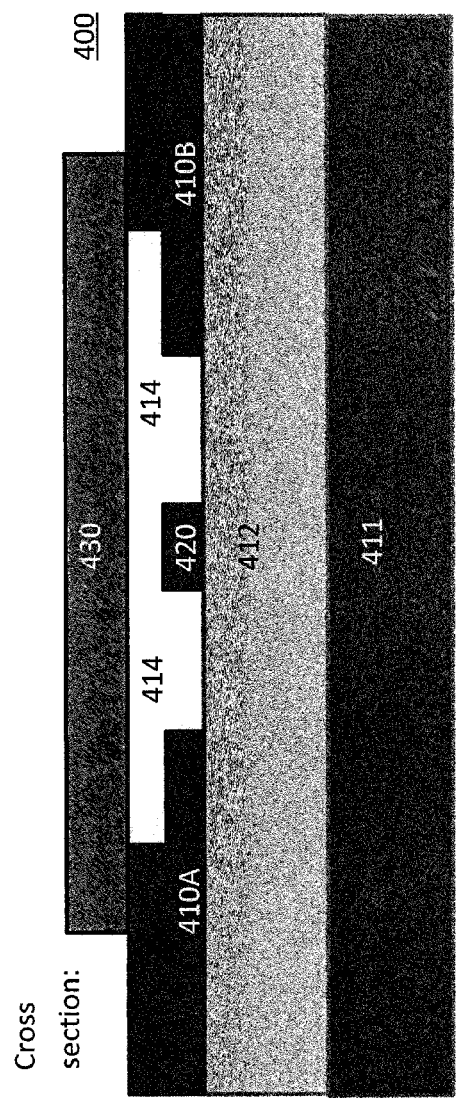
Top view:
FIG. 4A
Cross section:
FIG. 4B

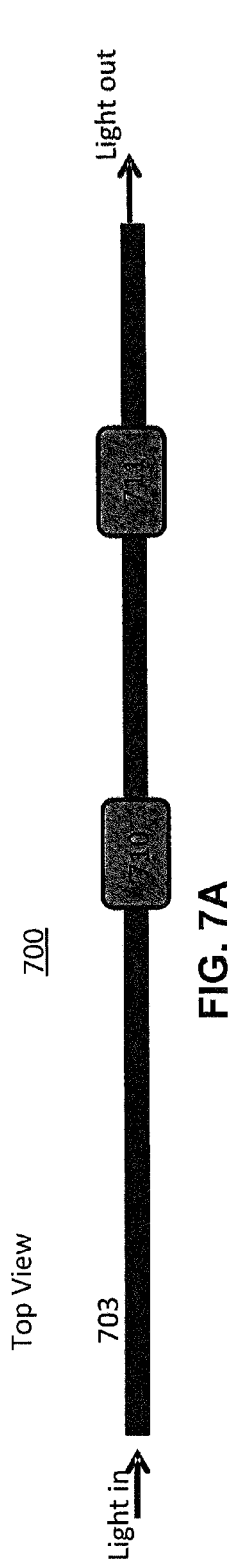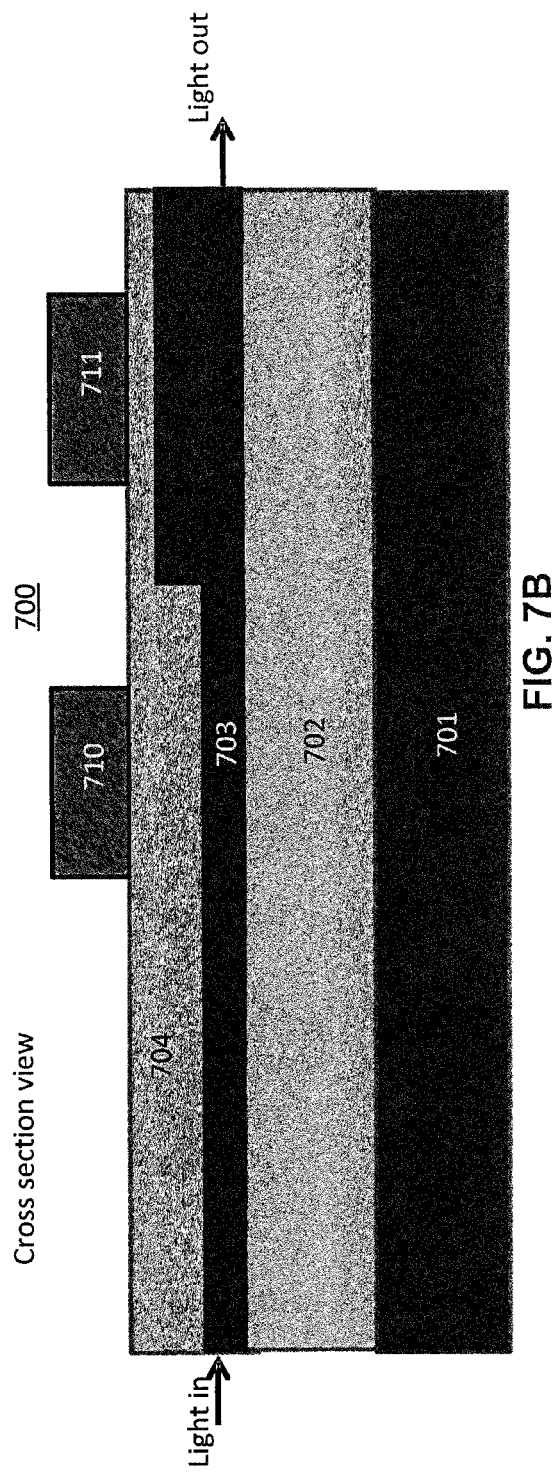

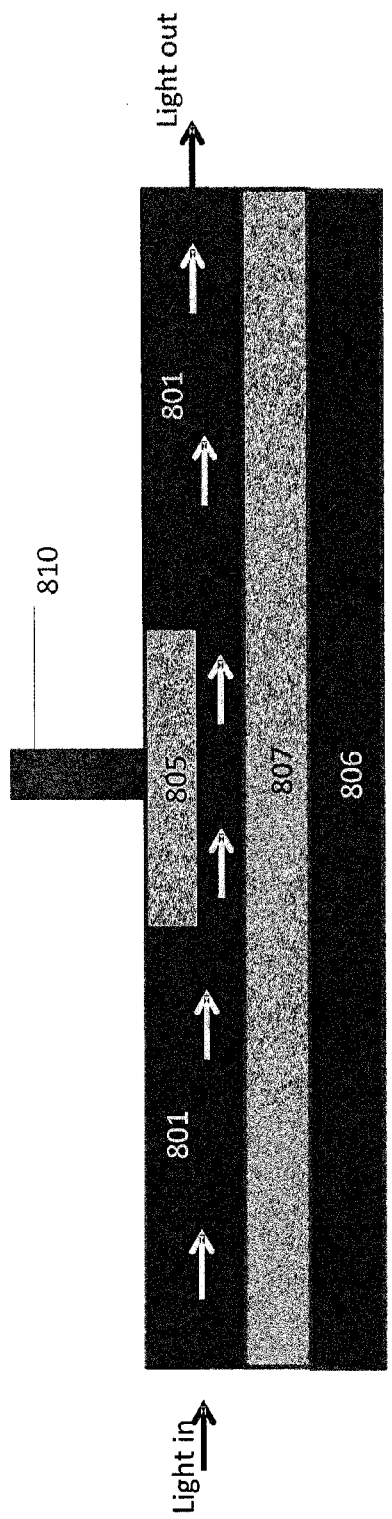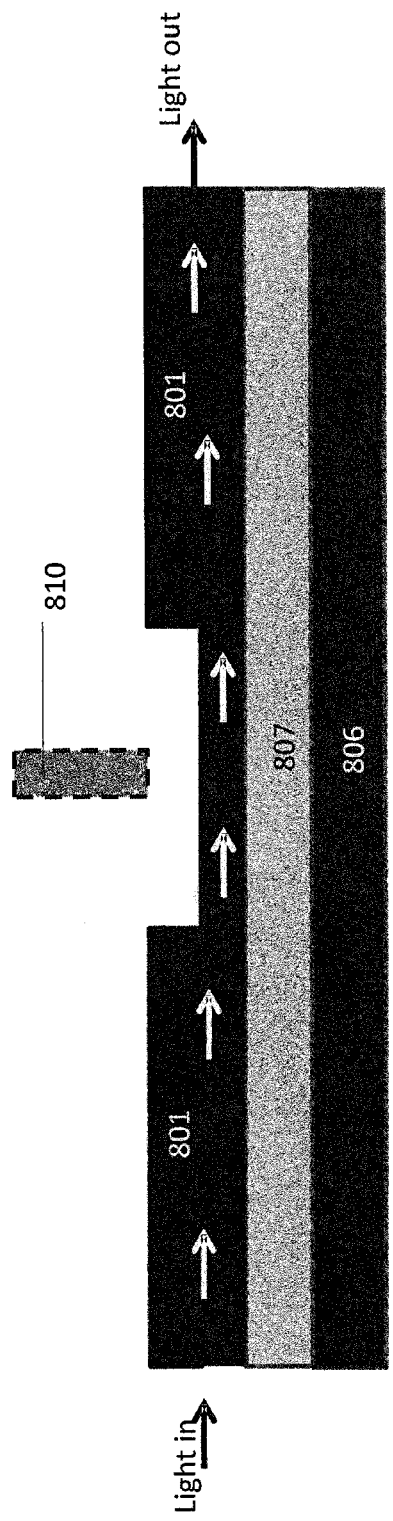
FIG. 8B
FIG. 8C

HETEROGENEOUS SEMICONDUCTOR PHOTONIC INTEGRATED CIRCUIT WITH MULTIPLE OFFSET HEIGHTS

FIELD

Embodiments of the invention generally pertain to optical devices and more specifically to offset heights in heterogeneous photonic integrated circuits.

BACKGROUND

The efficiency of an optical device (e.g., the aspects of the drive voltage or power requirement of the device) is fundamentally determined by the electro-optic materials used to construct the device. Silicon materials are more easily processed and more readily available, but are not as efficient at light emission or absorption as non-silicon materials (such as III-V materials), nor do they possess other desirable optical properties present in materials such as, magneto-optic materials, and other crystal substrate materials. Attempts have been made to create photonic devices utilizing these materials in addition to silicon, wherein the device's optical waveguide is formed and included silicon semiconductor material and non-silicon material (and, in some cases, the bonding layer combining both materials). These devices are referred to herein as heterogeneous photonic integrated circuits (PICs).

Heterogeneous PICs on silicon-on-insulator (SOI) substrates require a method of controlling the confinement factor of the optical mode in the heterogeneously integrated material. It is desirable to be able to achieve a wide range of optical confinement factors in the heterogeneous material, nearly spanning 0 to 100%, in order to efficiently transfer light between Si-only modes and heterogeneous modes, to avoid interaction of light with absorbing or scattering materials and structures, and to optimize optical and optoelectronic devices for characteristics dependent upon confinement factor of the mode in the heterogeneous material such as gain, saturation, absorption coefficient, nonlinear coefficients, and modulation efficiency per unit distance.

Current solutions rely on controlling the optical confinement in the heterogeneous material by laterally varying the dimension of either the silicon waveguide, the heterogeneous material, or both. The drawback of these approaches is that the flexibility to change confinement in the heterogeneous integrated material is dependent on the range of widths for which one can define the structures. The range of widths is restricted by lithography for both silicon waveguides and the heterogeneous integrated materials. In the case of active devices, the range of widths is additionally restricted by device design considerations such as the maximum width permissible to obtain the desired capacitance and current density, and the minimum width permitted to create electrical contacts and current channels.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 1A-FIG. 1F are illustrations of components of a heterogeneous optoelectronic device according to an embodiment of the invention.

FIG. 3A-FIG. 3C illustrate multiple heterogeneous integrated optoelectronic devices formed on an SOI substrate according to embodiments of the invention.

FIG. 4A and FIG. 4B are illustrations of a photonic integrated circuit utilizing a passive waveguide according to an embodiment of the invention.

FIG. 7A and FIG. 7B are illustrations of a plurality of in-line optical travelling-wave amplification photodetectors according to an embodiment of the invention.

FIG. 8A-FIG. 8C illustrate processing stages for forming a heterogeneous photonic integrated circuit according to an embodiment of the invention.

Figure 1A:
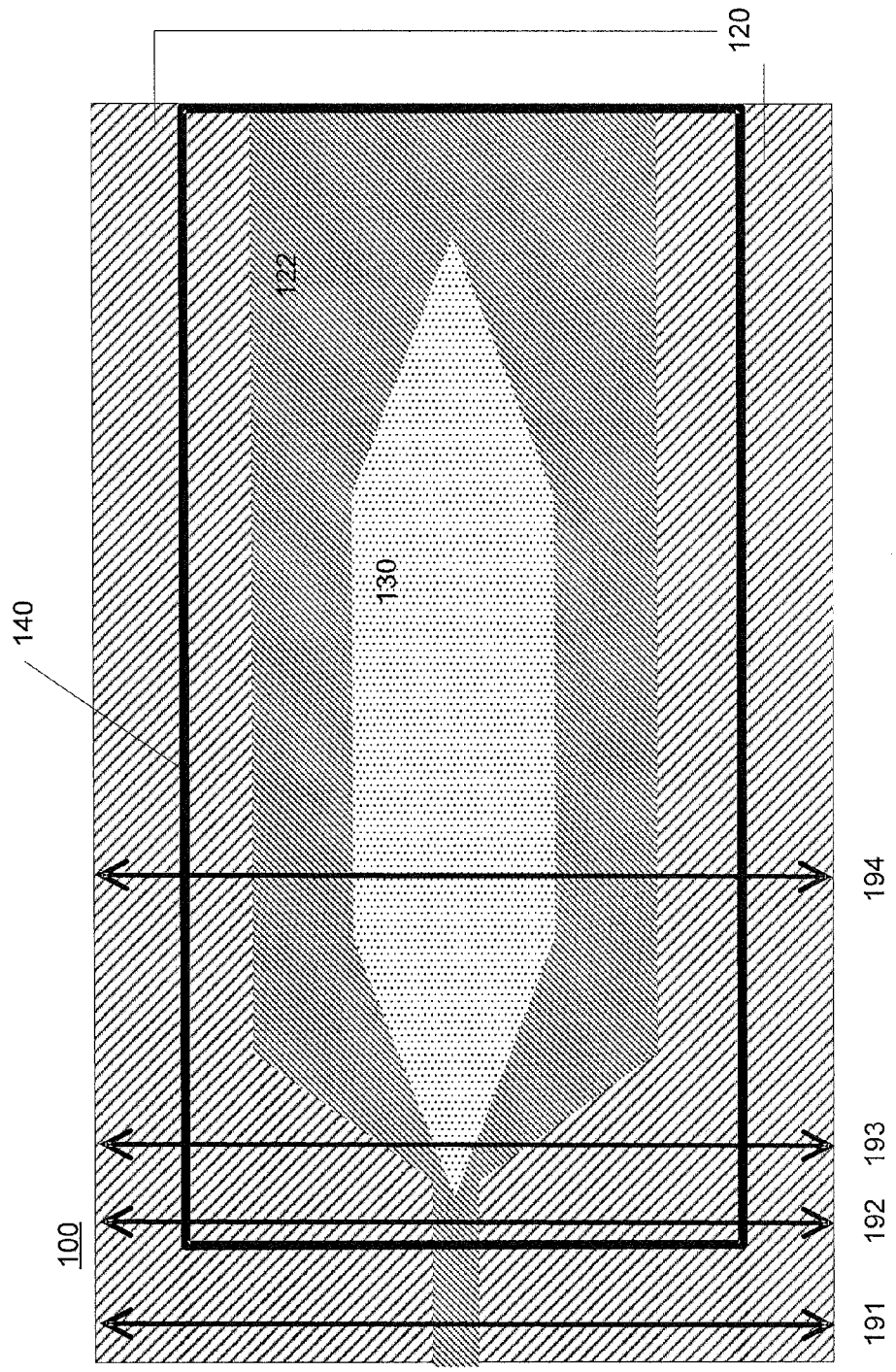

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe methods and apparatuses for utilizing multiple offset heights in heterogeneous silicon photonic integrated circuits (PICs). Said heterogeneous PICs comprise silicon and a non-silicon material. Said non-silicon material (herein referred to as "heterogeneous material") may comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V based materials may be significantly higher than in silicon based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in the heterogeneous optical devices described below; in embodiments of the invention, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may devices utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as such as iron, cobalt, or yttrium iron garnet (YIG).

Crystal substrate materials provide heterogeneous PICs with a high electro-mechanical coupling linear electro optic coefficient, low transmission loss, and stable physical and chemical properties. Said crystal substrate materials may comprise, for example, lithium niobate (LiNbO3) or lithium tantalate (LiTaO3).

Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

FIG. 1A-FIG. 1F are illustrations of components of a heterogeneous optoelectronic device according to an embodiment of the invention. FIG. 1A is a top-view of heterogeneous silicon-on-insulator (SOI) PIC 100. In this example embodiment, device 100 is shown to include silicon buried oxide layer 110, silicon slab layer 120 having a first vertical dimension and a second vertical dimension (shown in this example as rib waveguide 122), silicon rib layer 130 having a third vertical dimension (i.e., rib 132), silicon dioxide (SiO2) layer 125 (shown in FIGS. 1B-1F), and heterogeneous layer 140. As described below, an optical waveguide for PIC 100 is included in the Si/heterogeneous region, having a first optical mode confinement factor formed, at least in part, by rib waveguide 122 (i.e., the first and second vertical dimensions that form said rib waveguide) and a second optical mode confinement factor formed, at least in part, by the third vertical dimension in layer 130 (i.e., rib 132). Thus embodiments of the invention may be described as, in heterogeneous regions of a heterogeneous PIC, silicon waveguides using multiple heights of the silicon waveguide, or other structures with multiple offset heights between silicon and heterogeneous materials (as described below).

In this figure, cross section axes 191, 192, 193 and 194 describe the cross-sectional view point of FIGS. 1B, 1C, 1D and 1E, respectively, as described below.

FIG. 1B illustrates a cross section of PIC 100 at cross section axis 191. In this embodiment, silicon slab layer 120, silicon semiconductor rib layer 122 and oxide layer 125 (e.g., (SiO2) form a silicon-on-insulator (SOI) structure. As illustrated in this cross section, light received by the device via layer 120 is confined to an optical mode formed by a horizontal boundary of rib waveguide 122—alternatively referred to, for this embodiment, as a rib formed by two vertical dimensions of silicon slab layer 120.

FIG. 1C illustrates a cross section of PIC 100 at cross section axis 192. In this embodiment, device 100 further includes heterogeneous layer 140 disposed on SiO2 layer 125. At this cross section, light remains in silicon semiconductor layers 120 & 122, as the fundamental mode of the device resides in this layer due to rib 122 and is separated from the heterogeneous layer 140 by thick SiO2 in layer 125.

FIG. 1D illustrates a cross section of PIC 100 at cross section axis 193. In this embodiment, device 100 further includes silicon layer 130, including rib 132 (i.e., a rib having a second vertical dimension). As shown in FIG. 1A, this layer comprises a tapering width, such that in FIG. 1D, light is still confined to silicon layers 120 (in rib 122) and 130 (in rib 132); however, FIG. 1E, which illustrates a cross section of device 100 at cross section axis 194, the width of rib 132 has increased such that the fundamental mode of the device at this point overlaps layer 140. In this embodiment, both of said horizontal boundaries (i.e., ribs 122 and 132) are included in silicon layers; in other embodiments, a device's heterogeneous layer may include a horizontal boundary for coupling light into the heterogeneous layer.

FIG. 1F illustrates a cross section of PIC 100 at cross section axis 194 with light 199 propagating through the PIC. As illustrated in this embodiment, ribs 122 and 132 provide for low loss heterogeneous optical waveguide transitions between the devices' heterogeneous and silicon-only waveguides that do not have the structural issues of prior art solutions. As shown in this figure, light transitions from the silicon layers (i.e., layers 120 and 130) to heterogeneous layer 140.

Figure 2A:
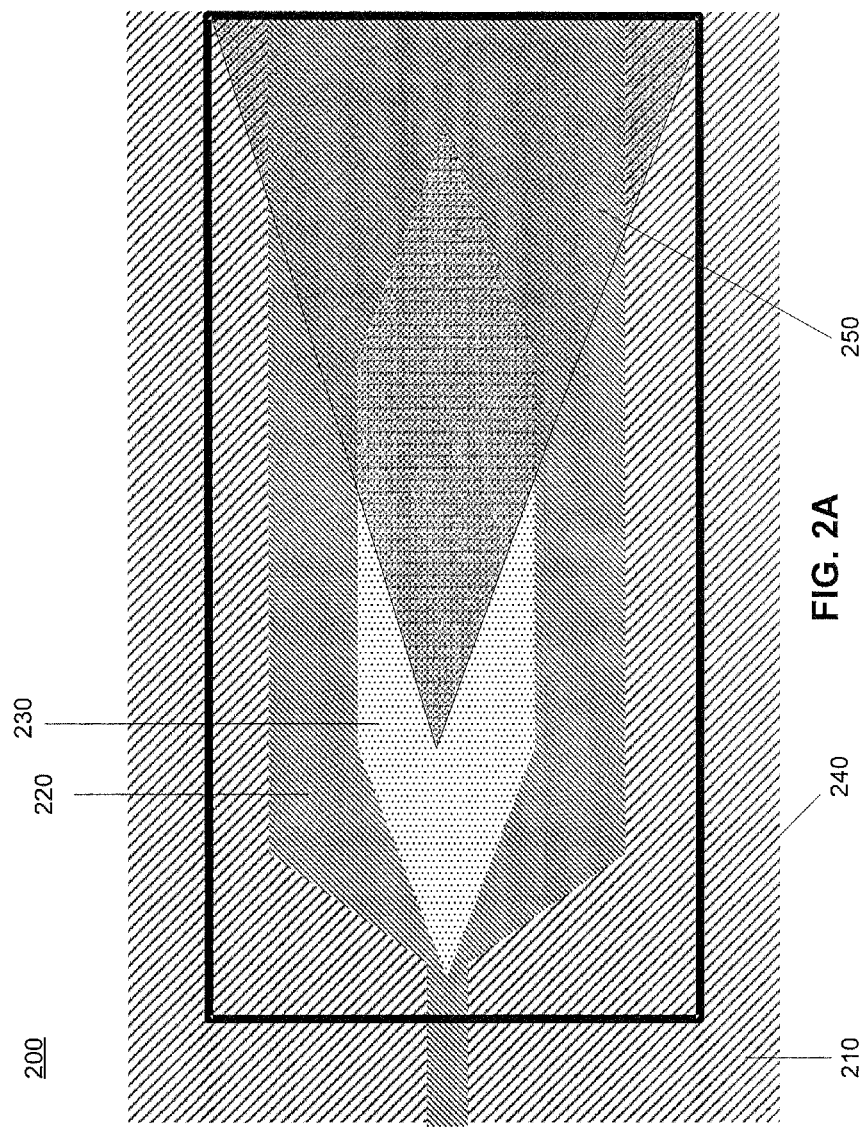
FIG. 2A-FIG. 2C are illustrations of components of a heterogeneous optoelectronic device according to an embodiment of the invention.
Figure 2B:
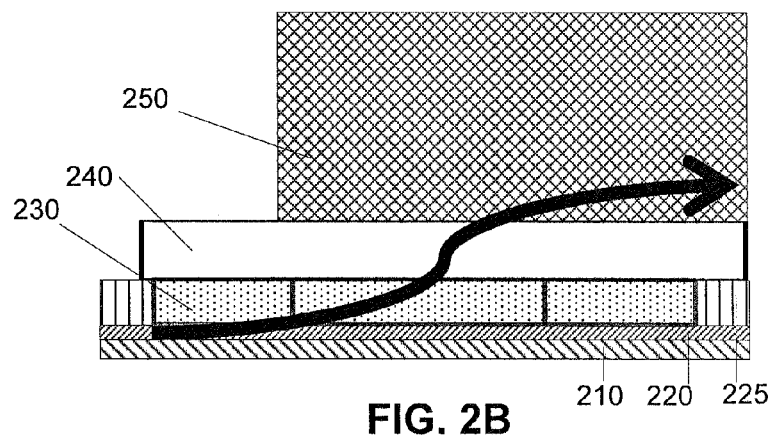
Figure 2C:
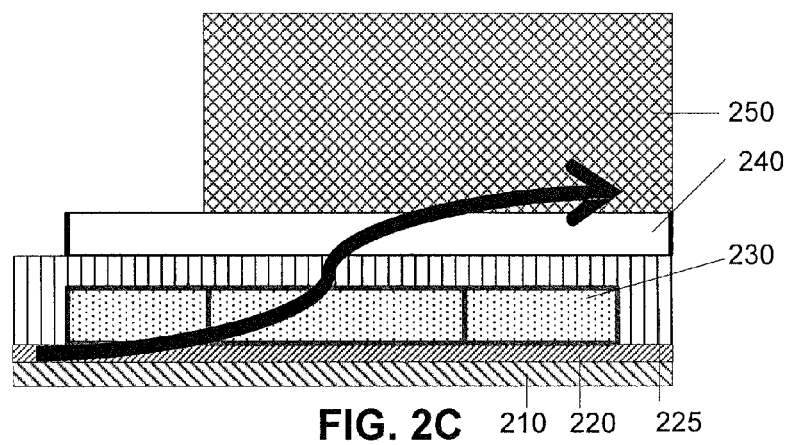

Alternative embodiments having the low loss heterogeneous optical waveguide transitions of FIG. 1A are possible, as shown in FIG. 2A and FIG. 2B. FIG. 2A-FIG. 2C components of a heterogeneous optoelectronic device according to an embodiment of the invention. In this embodiment, device 200 is shown to include buried oxide layer 210, silicon layer 220 having a first vertical dimension, silicon layer 230 having a second vertical dimension, SiO2 layer 225, heterogeneous n-layer 240 (e.g., n-InP) and heterogeneous p-layer 250 (e.g., MQW+p-InP). In this embodiment, heterogeneous layer 250 is tapered to allow for light to transition from heterogeneous layer 240, as shown in FIG. 2B. Furthermore, in the alternative embodiment shown in FIG. 2C, SiO2 layer 225 separates Si layer 230 from heterogeneous layer 240 (as opposed to the embodiment shown in FIG. 2B, where no layer separates the device's Si and heterogeneous layers).

Figure 3A:
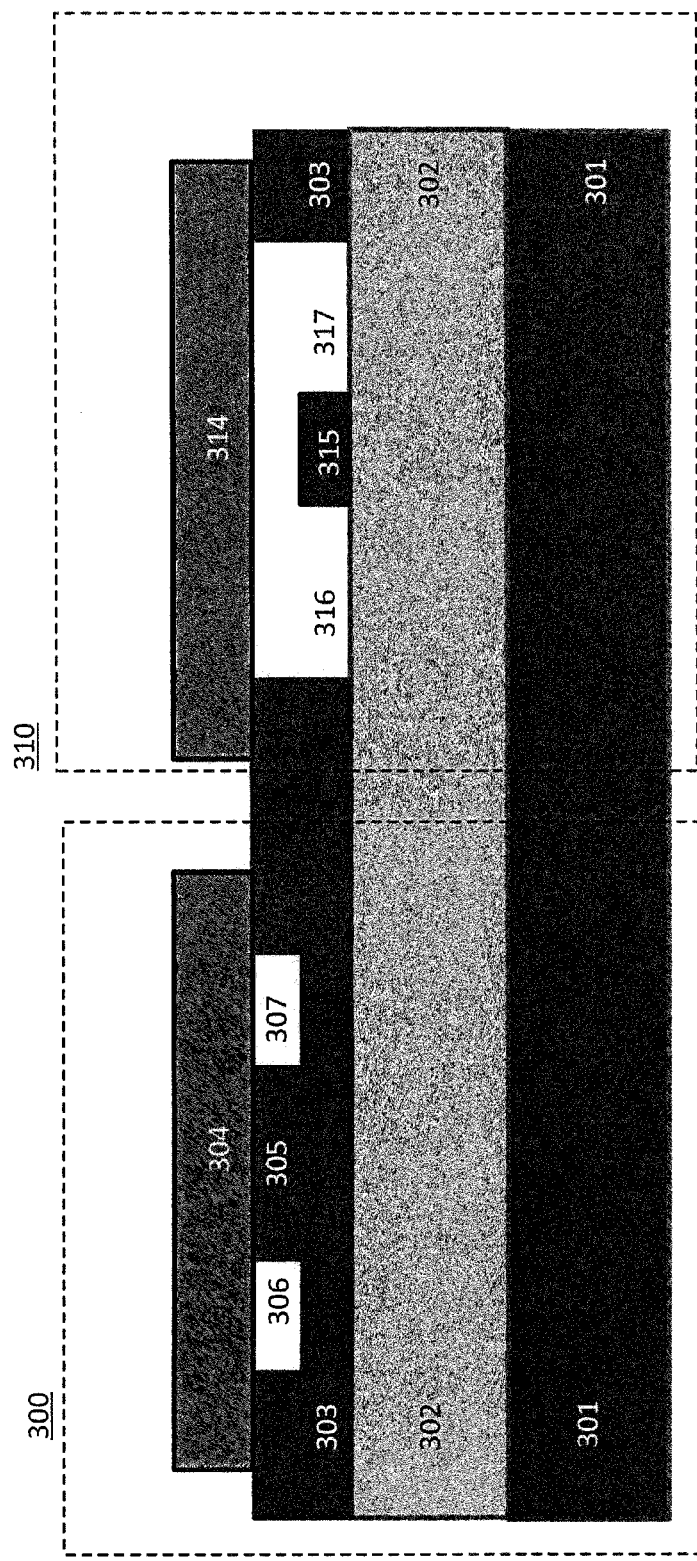
Figure 3C:
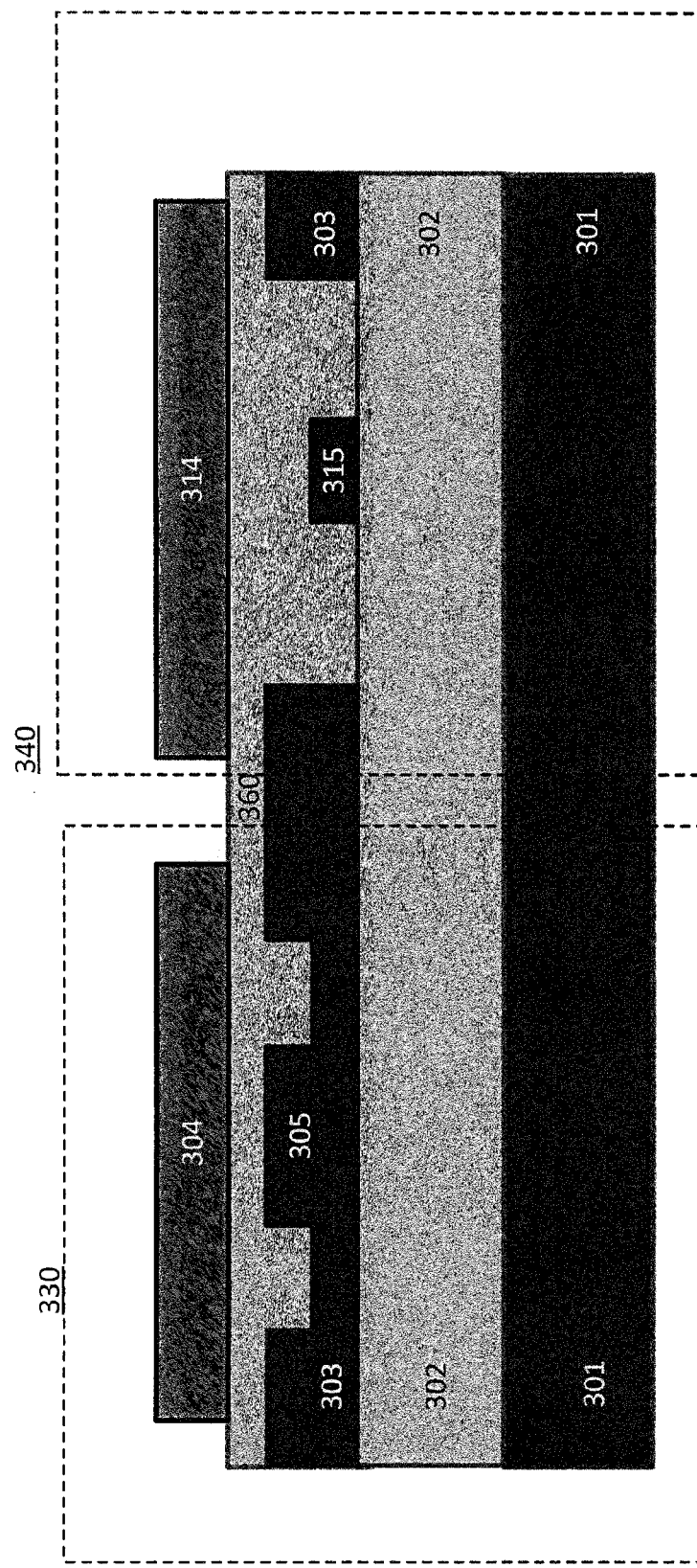

FIG. 3A-FIG. 3C illustrate multiple heterogeneous integrated optoelectronic devices formed on an SOI substrate according to embodiments of the invention. FIG. 3A illustrates devices 300 and 310 having substrate layer 301, oxide layer 302, silicon layer 303, and heterogeneous layers 304 and 314, respectively. Each device further includes regions 306, 307, 316 and 317, which may comprise a low index cladding layer, air, or any functionally equivalent material.

In this embodiment, device 300 includes lateral boundary 305, e.g., a rib waveguide, to confine an optical mode for the device. Said rib waveguide for device 300 is formed from a first height and a second smaller height of the region of silicon layer 303 included in said device. In other words, the different "heights" of the region of silicon layer 303 included in device 300 form the main body of rib waveguide 305. Any variation of said heights may used in embodiments of the invention, including having the second smaller height comprise a minimal or "zero" value. Furthermore, any process known in the art may be used to form the variations of said heights (e.g., partial etch, partial disposition, etc.). In this embodiment, rib waveguide 305 contacts heterogeneous layer 304 to provide high optical confinement for device 100 (e.g., for a device such as a high bandwidth photodetector).

Device 310 includes a lateral boundary 315, e.g., a wire waveguide 315, to confine an optical mode for the device. Similar to rib waveguide 305, said wire waveguide for device 310 is formed from a first height and a second smaller height of the region of silicon layer 303 included in said device. In other words, the different "heights" of the region of silicon layer 303 included in device 310 form the main body of wire waveguide 315. Any variation of said heights may be used in embodiments of the invention, including having the second smaller height comprise a minimal or "zero" value. For this device, wire waveguide 310 does not contact heterogeneous layer 314, thereby providing low optical confinement for the device (e.g., for a device such as a tap photodetector which only absorbs a small fraction of the light which passes through it or a high saturation power detector). Thus, multiple separation distances between silicon layer 303 and heterogeneous layers 304/314 provide for varying optical confinement properties for devices 300 and 310.

FIG. 3B illustrates an alternative embodiment for providing multiple separation heights between silicon and heterogeneous layers. Similar to FIG. 3A, FIG. 3B illustrates device 300 having a high optical confinement, and device 320 having a low optical confinement. In this embodiment, heterogeneous layer 324 includes horizontal boundary 325, such that the heterogeneous layer does not contact silicon layer 303. Thus, as opposed to example embodiments described above which have multiple silicon offset heights, the heterogeneous layer of device 320 includes a horizontal boundary to define a vertical dimension for controlling the coupling of light into the heterogeneous layer; in other words, waveguides 305 and 315 of FIG. 3B may comprise rib waveguides having the same maximum height for forming their main bodies (as described above in the description of FIG. 3A), but the above described variations in heterogeneous layers 304/324 provide for the aforementioned varying optical confinement properties.

FIG. 3C illustrates an alternative embodiment for providing multiple separation heights. Similar to FIG. 3A, FIG. 3C illustrates two devices, devices 330 and 340, having substrate layer 301, oxide layer 302, silicon layer 303, and heterogeneous layers 304 and 314, respectively. Due to the varying heights of silicon waveguides 305 and 315, device 330 has a high optical confinement, and device 340 has a low optical confinement. In this embodiment, said devices include low index cladding layer 360 to separate the waveguides of each device (i.e., rib waveguide 305 and wire waveguide 315) from their respective heterogeneous device layers. In alternative embodiments, low index cladding material as described above may be present in only one of the devices.

Fabricating multiple heights in device layers for PICs allows for the use of adiabatic tapers between passive silicon waveguides and heterogeneous devices with low insertion loss and return loss. In some embodiments, a heterogeneous material may be used as an additional passive waveguide layer, enabling low-crosstalk waveguide crossings of waveguides in the heterogeneous and the silicon layer. This material may be a dedicated passive layer or may serve a dual function, such as a phase modulator epitaxy.

FIG. 4A and FIG. 4B are illustrations of a PIC utilizing a passive waveguide according to an embodiment of the invention. Passive waveguides may have low-crosstalk crossings with active devices. In this embodiment, as shown in top-view illustration FIG. 4A, device 400 includes silicon waveguide 410 (shown as waveguide sections 410a and 410b) crossing silicon waveguide 420. It is understood that waveguide crossings can cause signal loss for both waveguides and bring about a crosstalk between the crossing waveguides.

In this embodiment, heterogeneous material 430 is used as a passive waveguide to reduce the amount of potential crosstalk between waveguides 410 and 420. As shown in cross section illustration FIG. 4B, silicon waveguide 410A/B is formed on an SOI structure including substrate layer 411 and buried oxide layer 412. Light entering a mode in waveguide 410A transfers power through material 430 and into 410B with low loss by using heterogeneous tapers. Waveguide 420 has a greater separation height from material 430 than the separation height of 410 and 430, so that there is low crosstalk between the two optical paths of waveguides 410A/B and 420 at the crossing. Each waveguide segment of waveguide 410A/B is shown to include a taper having multiple silicon heights for transitioning the mode of the waveguide to heterogeneous layer 430. In this embodiment, said multiple silicon heights form gaps 414 between the silicon layer and heterogeneous layer 430; this gap allows for the heterogeneous layer to not have a taper to enable optical coupling.

Thus, in the example embodiments discussed previously, one advantage for having multiple separation distances between silicon and non-silicon regions is to vary optical functionality within a device (or devices); however, as discussed above with respect to FIGS. 4A and 4B, embodiments of the invention on the scale of PICs allow for waveguide layers to cross without interacting, eliminating the potential for unwanted reflection or waveguide crosstalk between the layers.

Figure 5A:
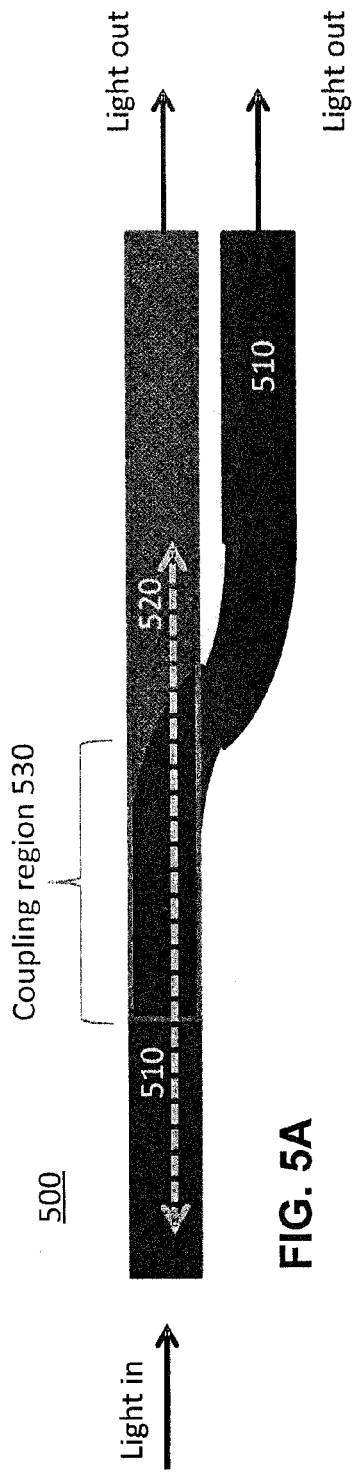
FIG. 5A and FIG. 5B are illustrations of a vertical directional coupler according to an embodiment of the invention.
Figure 5B:
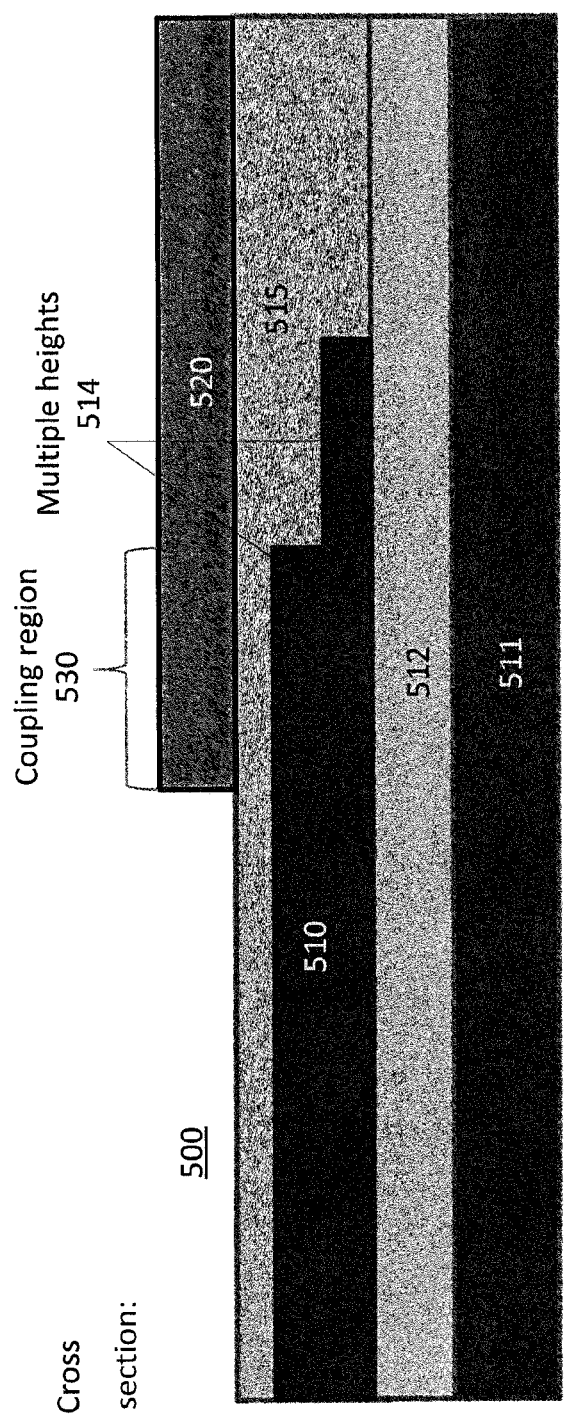

FIG. 5A and FIG. 5B are illustrations of a vertical directional coupler according to an embodiment of the invention. In this embodiment, PIC 500 includes silicon rib waveguide 510 and heterogeneous waveguide 520. As shown in cross-section 5B, PIC includes substrate layer 511, buried oxide layer 512, along with silicon rib waveguide 510, low index cladding layer 515 and heterogeneous waveguide layer 520 disposed above the cladding layer.

In this embodiment, a vertical directional coupler between silicon and heterogeneous material can be fabricated by taking advantage of high fabrication tolerances of layers with small thicknesses when using the heterogeneous material as a passive waveguide. Said vertical directional coupler splits or completely transmits light between the silicon and heterogeneous waveguides. In this embodiment, the heterogeneous layer is being used as a passive waveguide with three-dimensional geometry (similar to the embodiments of FIG. 4A/4B). Silicon waveguide 510 includes multiple silicon heights 514 for transitioning the mode of the waveguide to heterogeneous layer 520, and thus eliminates the potential for unwanted reflection or waveguide crosstalk between the layers.

Figures 6A, 6B:
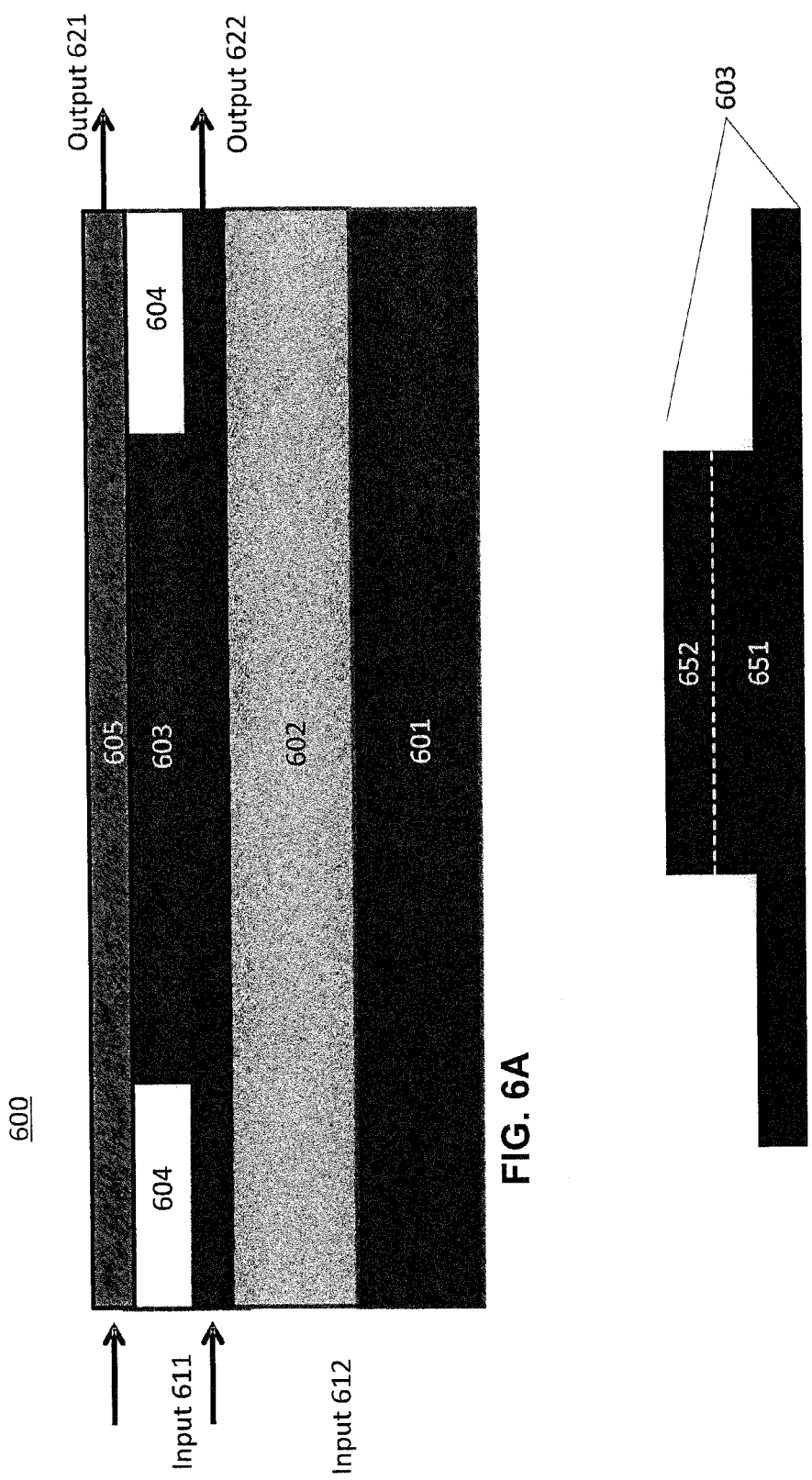
FIG. 6A and FIG. 6B are illustrations of a vertical multimode interference device according to an embodiment of the invention.

FIG. 6A and FIG. 6B are illustrations of a vertical multimode interference device according to an embodiment of the invention. A vertical multimode interference (MMI) structure may be utilized for power splitting and for the separation or combination of wavelengths or polarizations.

Device 600, as shown in FIG. 6A includes substrate layer 601, oxide layer 602, silicon layer 603, low index cladding layer 604 and heterogeneous layer 605. Silicon layer 603 is shown to include multiple separation distances from heterogeneous layer 605, formed by regions (e.g., ribs) 651 and 652 as shown in the cross-sectional illustration of FIG. 6B. (similar to the embodiment described in FIG. 1). Utilizing these multiple separation distances allows optical inputs 611 and 612 to be separated and combined in various ways for optical outputs 621 and 622 by varying the separation distances of the silicon and heterogeneous layers.

FIG. 7A and FIG. 7B are illustrations of a plurality of in-line optical tap detectors according to an embodiment of the invention. As described above, embodiments of the invention enable the creation of low optical confinement heterogeneous structures with low return loss due to creating small interactions of the mode with the heterogeneous material. Such structures can be fabricated with abrupt interfaces instead of adiabatic transitions.

In this embodiment, device 700 is shown to include silicon waveguide layer 703 (disposed over oxide layer 702 and substrate layer 701) and in-line optical tap detectors 710 and 711. An in-line optical tap detector couples and absorbs a fraction of light propagating through the waveguide. The amount of light coupled and absorbed by the detector varies based, in this embodiment, on evanescent coupling through cladding layer 704.

In this embodiment, detector 710 has a low interaction with silicon waveguide 703, due to the distance between the two regions (which is separated by cladding layer 704); detector 711 will have a relatively higher interaction with silicon waveguide 703, due to the relatively smaller distance between the two regions (which is separated by smaller amount of cladding layer 704 compared to detector 710).

Thus, silicon waveguide layers with multiple separation distances, as described by embodiments of the invention, may vary to make the absorption per distance within detectors large, having a strong interaction with the silicon waveguide, or may vary to make the absorption per distance within detectors small, having a weak interaction with the silicon waveguide. For example, the interaction of light for photodetector 710 may be small in order to tap a small fraction of power in the optical mode in the photodetector; such a configuration could be used to set the bias operating points of a photonic integrated circuit via feedback. The interaction of light for photodetector 711 may be large to absorb a large fraction of power in the optical mode in the photodetector; such a configuration could be used to convert an amplitude-encoded signal from the optical to the electrical domain.

Figure 8A:
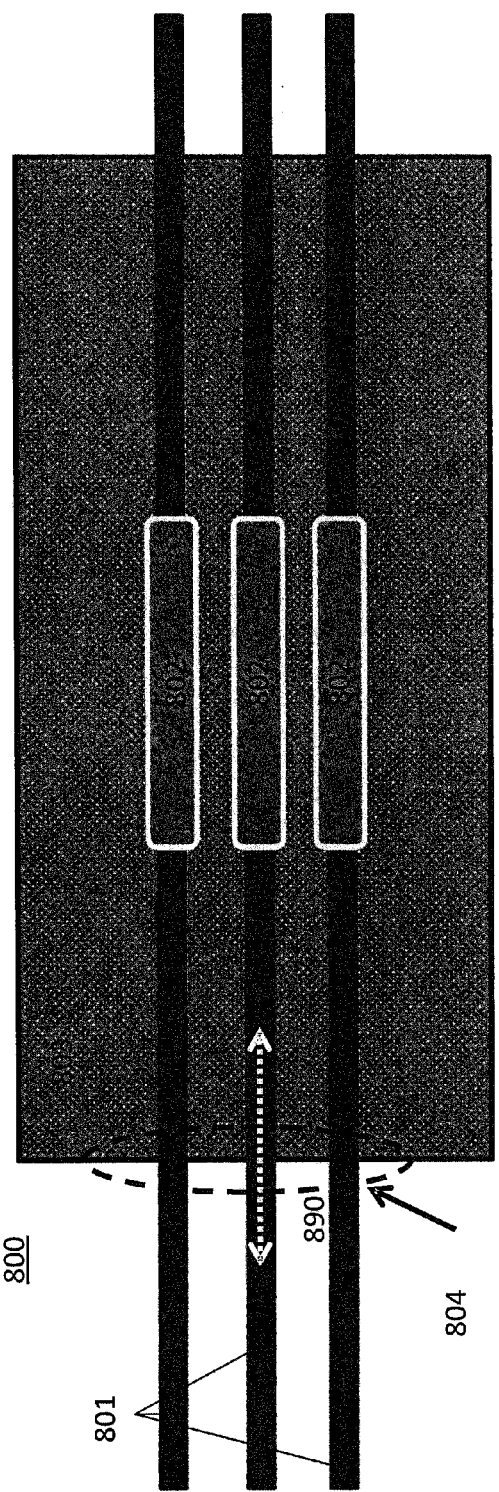

FIG. 8A-FIG. 8C illustrate processing stages for forming a heterogeneous PIC according to an embodiment of the invention. Heterogeneous processing may deposit materials upon processed SOI wafers which cannot be removed, or may damage regions of the surface of the processed SOI wafer. Embodiments of the invention may utilize silicon layers with multiple separation distances to prevent degradation of waveguide performance in subsequent processing operations.

FIG. 8A is a top view of silicon/heterogeneous device layers during a processing stage. In this embodiment, silicon waveguides 801 are shown to be bonded to heterogeneous devices 802. Reference element 803 identifies where the heterogeneous material is bonded to the silicon waveguides.

Reference element 804 identifies a location where heterogeneous material ledge residue (i.e., residue from when the heterogeneous layer is bonded to the silicon layer) may accumulate. FIG. 8B is a cross sectional illustration (at cross section 890) showing the cross section where the lower-level silicon waveguide (shown here disposed over oxide layer 807 and substrate layer 806) is used to avoid interaction with an optical mode of ledge 810, formed from residue accumulated at the bonding edge. In this embodiment, temporary cladding layer 805 is used to fill the additional space created by the multiple silicon heights of silicon waveguide layer 801 (i.e., the multiple separation distances between silicon waveguide layer 801 and heterogeneous layer 802). In other words, the waveguides at a height below the bonding interface may be clad with a protective material during processing (which is removed after heterogeneous integration as described below).

Thus, FIG. 8B is an illustration of a processing operation, where the lower level silicon waveguides of layer are used to avoid interaction of its optical mode with ledge 810. The transfer between the silicon waveguides of layer 801 may be accomplished, for example, via tapers.

FIG. 8C is an illustration of a subsequent processing operation, wherein temporary cladding layer 805 and ledge 810 are removed. The multi-levels of silicon layer 801 were utilized to avoid interaction of the optical mode of ledge 810, even though the materials were removed at this stage of processing.

Reference throughout the foregoing specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments. In addition, it is appreciated that the figures provided are for explanation purposes to persons ordinarily skilled in the art and that the drawings are not necessarily drawn to scale. It is to be understood that the various regions, layers and structures of figures may vary in size and dimensions.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

The invention claimed is:

1. An apparatus comprising:
 a non-silicon slab;
 a silicon semiconductor slab, having a first silicon region, and a second silicon region for exchanging light with the non-silicon slab; and
 a cladding layer disposed between the non-silicon slab and the silicon semiconductor slab;
 wherein a maximum height of the first silicon region is separated from the non-silicon slab by a first distance, and a maximum height of the second silicon region is separated from the non-silicon slab by a second distance greater than the first distance.

2. The apparatus of claim 1, wherein, for one of the first or second silicon regions, the maximum height and a smaller height of the region forms a rib waveguide structure.

3. The apparatus of claim 1, wherein, for one of the first or second silicon regions, the maximum height and a smaller height of the region forms a wire waveguide structure.

4. The apparatus of claim 1, wherein the non-silicon material comprises III-V semiconductor material.

5. The apparatus of claim 1, wherein the non-silicon material comprises magneto-optic material.

6. The apparatus of claim 1, wherein the non-silicon material comprises crystal substrate material.

7. The apparatus of claim 1, wherein the non-silicon material comprises a region directly contacting a region of the silicon semiconductor slab.

8. The apparatus of claim 1, wherein the cladding layer separates the non-silicon slab and the silicon semiconductor slab such that no regions of the slabs directly contact each other.

9. The apparatus of claim 1, further comprising:
 an air gap between a waveguide of the silicon semiconductor slab and the non-silicon slab.

10. The apparatus of claim 1, wherein non-silicon slab includes features of varying height to form at least one of the first and second distances separating the non-silicon slab and the silicon semiconductor slab.

11. The apparatus of claim 1, wherein silicon semiconductor slab includes features of varying height to form at least one of the first and second distances separating the non-silicon slab and the silicon semiconductor slab.

12. The apparatus of claim 1, wherein the cladding layer comprises silicon dioxide (SiO2).

13. The apparatus of claim 1, wherein the cladding layer comprises chemical vapor deposition (CVD) diamond.

14. The apparatus of claim 1, further comprising:
a taper included in the silicon semiconductor slab and having multiple heights for coupling a mode from a silicon waveguide to a waveguide in the non-silicon slab.

15. The apparatus of claim 14, wherein the non-silicon slab further includes a taper to receive light from the taper included in the silicon semiconductor slab.

16. A system comprising:
a non-silicon region;
a first and a second silicon waveguide disposed below the non-silicon waveguide, the first and the second silicon waveguide separated from the non-silicon region by a first and a second separation distance, respectively, the first and the second separation distances to have different values; and
a cladding layer disposed between the non-silicon region and the silicon waveguides.

17. The system of claim 16, wherein the first and second silicon waveguides comprise crossing optical paths, and the non-silicon region comprises a passive waveguide for one of the silicon waveguides.

18. The system of claim 16, wherein the non-silicon region includes first and second photodetection regions disposed over the first and second silicon waveguides, respectively.

* * * * *